Jan. 26, 1971        R. P. DOERER        3,558,382
METHOD AND APPARATUS FOR MAKING A TRIM STRIP
Filed June 27, 1967        4 Sheets-Sheet 1
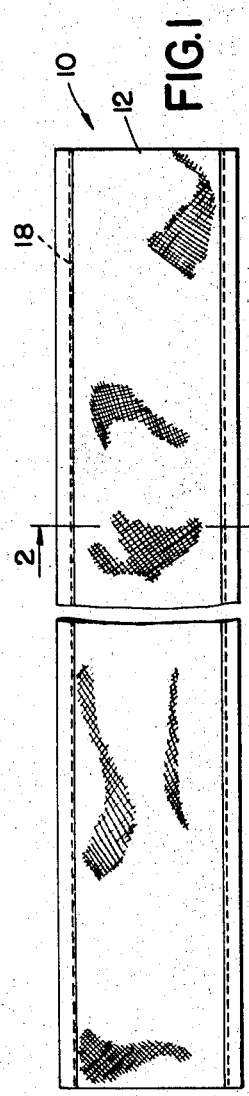
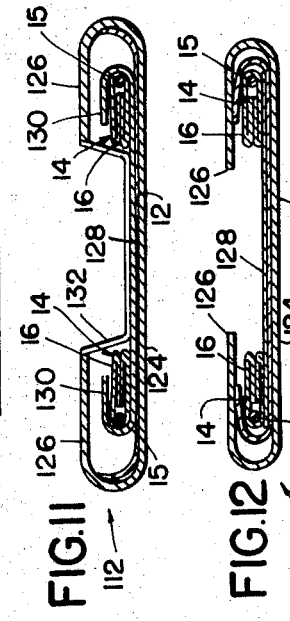
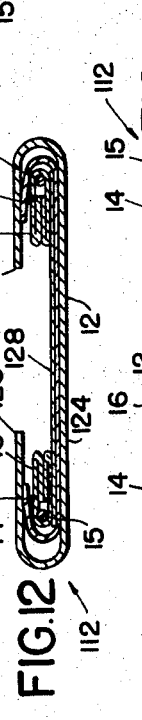
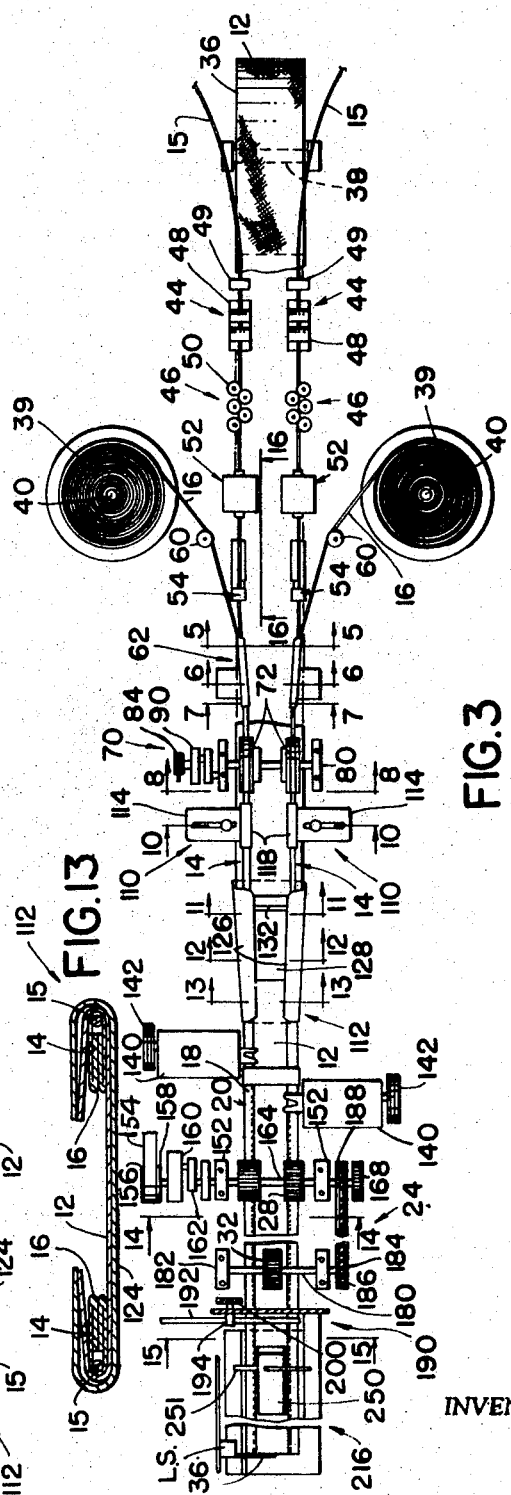
INVENTOR
RICHARD P. DOERER
BY *Whittemore, Hulbert & Belknap*
ATTORNEYS

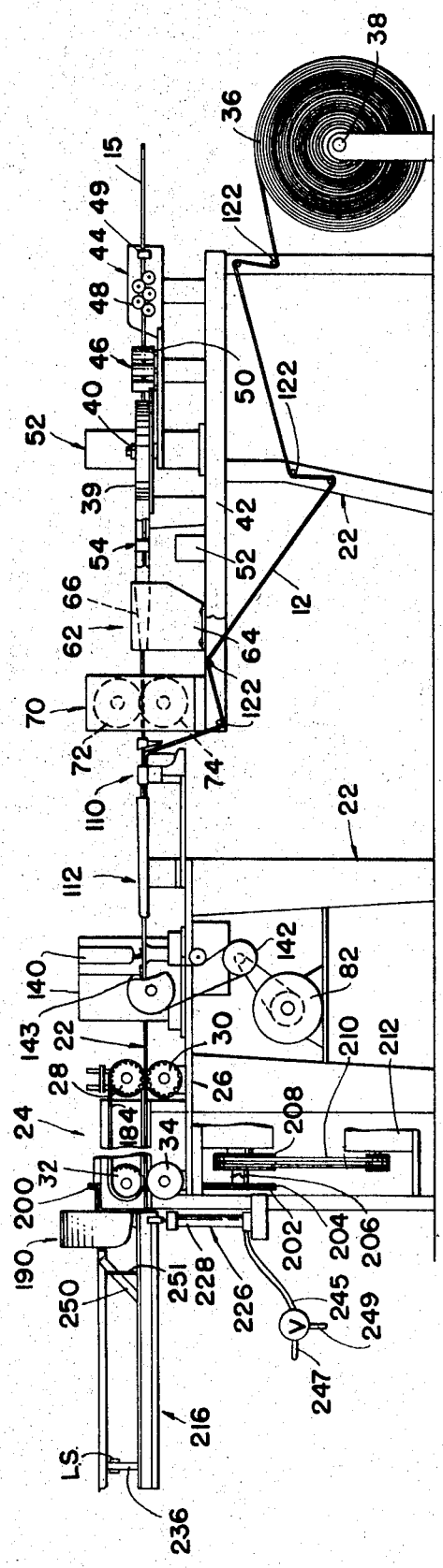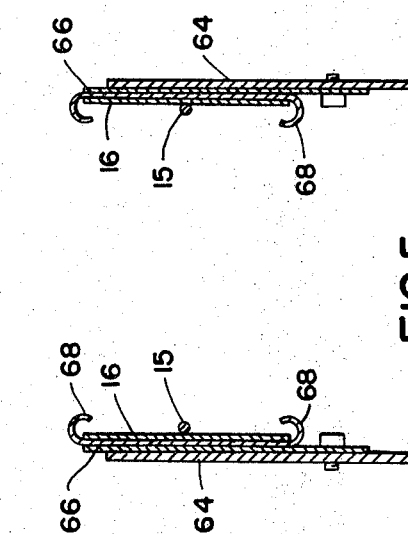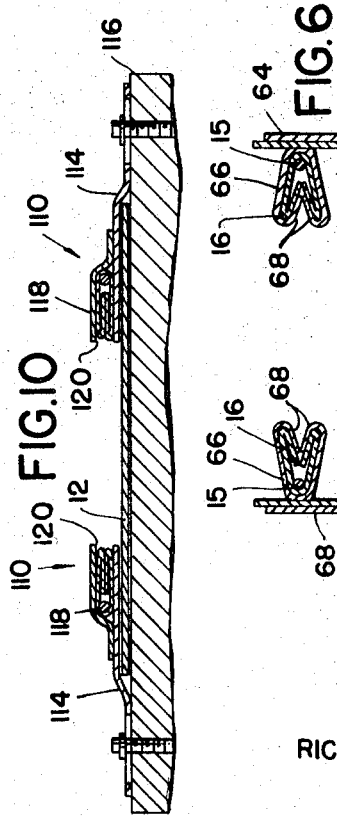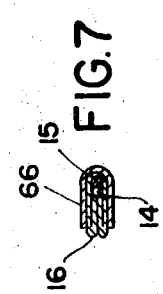

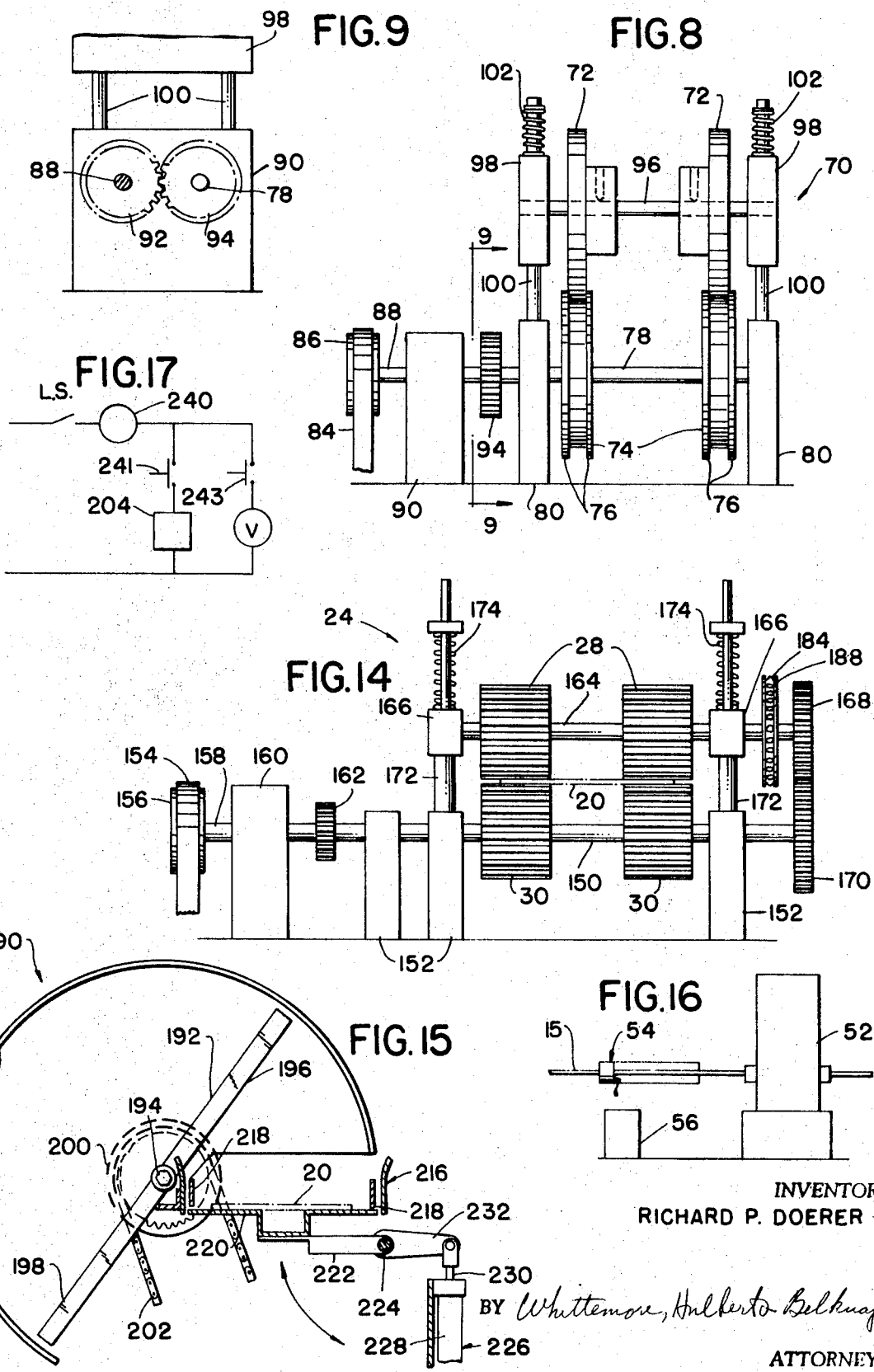

Jan. 26, 1971 R. P. DOERER 3,558,382
METHOD AND APPARATUS FOR MAKING A TRIM STRIP
Filed June 27, 1967 4 Sheets-Sheet 4

INVENTOR
RICHARD P. DOERER

BY Whittemore, Hulbert & Belknap
ATTORNEYS

United States Patent Office 3,558,382
Patented Jan. 26, 1971

3,558,382
METHOD AND APPARATUS FOR MAKING A TRIM STRIP
Richard P. Doerer, Ypsilanti, Mich., assignor to Van Dresser Corporation, Warren, Mich., a corporation of Michigan
Filed June 27, 1967, Ser. No. 649,157
Int. Cl. B32b 3/04
U.S. Cl. 156—93                                   10 Claims

ABSTRACT OF THE DISCLOSURE

The method and apparatus of this invention have been developed for making a trim strip of the type which may be used for furniture or automotive seat cushions and seat backs. The trim strip is composed of an elongated strip of flexible material reinforced with one or more covered strands.

The strand or strands are covered by a suitable material such for example as plastic or adhesively applied paper or fabric tapes. The strip of flexible material is guided into adjacent relation with the covered strand or strands and folded over the covered strand or strands and secured thereto to provide a continuous length of trim strip material which may be severed in predetermined lengths.

---

It is an essential object of the invention to provide a method and apparatus which integrates into one continuous operation the covering of the strand or strands and the securing of the covered strand or strands to the length of flexible material.

Another object is to provide a method and apparatus wherein the strand or strands are covered with tape as a part of the continuous operation. Specifically, a tape is guided alongside and folded over each strand. The strand or strands may be coated with adhesive so as to adhere to the tape.

Another object is to provide a method and apparatus wherein the strand or strands are covered wtih a material such as plastic, as part of the continuous operation. Specifically the strand or strands may be guided through a bath of the liquid covering material.

Another object is to provide a method and apparatus wherein the strip of flexible material is guided alongside the covered strand or strands as the latter continue to advance following the covering operation, and the strip of flexible material is folded over the advancing covered strand or strands to produce the reinforced trim strip material.

Another object is to effect the severing of trim strips of predetermined length from the advancing trim strip material as part of the continuous unitized operation.

Other objects and features of the invention will become apparent as the description proceeds, especially when taken in conjunction with the accompanying drawings, wherein:

FIG. 1 is a plan view with parts broken away showing a trim strip produced by the method and apparatus of my invention.

FIG. 2 is an enlarged sectional view with parts broken away taken on the line 2—2 of FIG. 1.

FIG. 3 is a semidiagrammatic plan view of the apparatus constructed according to my invention and designed to carry out the method of my invention.

FIG. 4 is a side elevational view with parts broken away and in section of the apparatus shown in FIG. 3.

FIG. 5 is a sectional view taken on the line 5—5 of FIG. 3.

FIG. 6 is a sectional view taken on the line 6—6 of FIG. 3.

FIG. 7 is a sectional view taken on the line 7—7 of FIG. 3.

FIG. 8 is a view taken on the line 8—8 of FIG. 3.

FIG. 9 is a view with parts in section and parts in elevation taken on the line 9—9 of FIG. 8.

FIG. 10 is a sectional view taken on the line 10—10 of FIG. 3.

FIG. 11 is a sectional view taken on the line 11—11 of FIG. 3.

FIG. 12 is a sectional view taken on the line 12—12 of FIG. 3.

FIG. 13 is a sectional view taken on the line 13—13 of FIG. 3.

FIG. 14 is a view taken on the line 14—14 of FIG. 3.

FIG. 15 is a view with parts in section and parts in elevation taken on the line 15—15 of FIG. 3.

FIG. 16 is a view taken on the line 16—16 of FIG. 3.

FIG. 17 is a wiring diagram.

Figure 18:
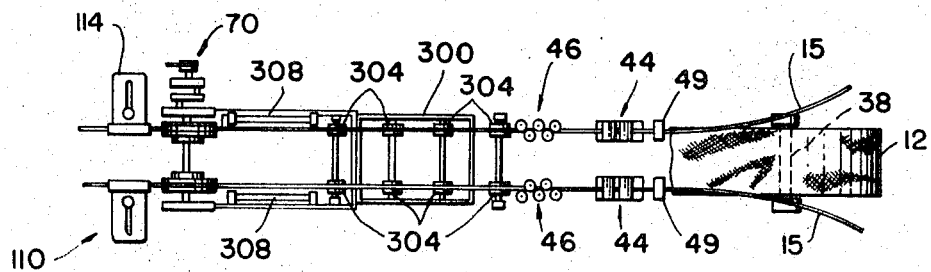
FIG. 18 is a fragmentary semidiagrammatic plan view of a modified apparatus designed to carry out the method of my invention.

The method and apparatus of this invention provide for the continuous manufacture of reinforced trim strip material from which the individual trim strips are severed. Such trim strips may be employed in furniture or automobile seats to trim the edges of the seat cushion and seat back.

The trim strip shown in FIGS. 1 and 2 is generally designated 10 and comprises an elongated strip of flexible material 12 such for example as fabric or plastic, and one or more elongated strand reinforcements 14. The reinforcements 14 comprise elongated flexible covered strands 15. The strands 15 may be formed of any suitable flexible material such for example as metal, plastic-coated metal or plastic. Preferably, the strands 15 are straight as shown, but may be sinuous or of other configuration. The strands 15 may, for example, be covered by elongated tapes 16 of paper or like material (FIGS. 1–17), or by a plastic coating (FIGS. 18–21). With reference to FIGS. 1–17, the tapes are folded over and preferably adhered by a suitable adhesive to the strands 15. The paper-covered strand reinforcements 14 preferably extend along the opposite longitudinal edges of the flexible material, which edges are folded over the reinforcements 14 and secured in folded condition by the lines of stitching 18. The lines of stitching preferably extend through the tapes 16.

The trim strips 10 are severed from a continuous length 20 of the reinforced trim strip material produced by the method and apparatus which will now be described.

Referring particularly to FIGS. 3 and 4, the machine for manufacturing trim strips of the type shown in FIGS. 1 and 2 includes the frame 22 for supporting the various components of the machine in positions to perform the necessary sequence of operations. The means for advancing the various components of the trim strip material through the machine includes the pulley roller structure generally designated 24 located near the rear or left end of the machine as viewed in FIGS. 3 and 4 and supported upon the table 26 of the frame 22. The pulley roller structure engages the continuous length of reinforced trim strip material 20 after it has been formed but before the individual trim strips 10 have been cut off. The pulley roller structure 24 includes two pairs of upper and lower knurled pulley rollers 28 and 30. One pair of pulley rollers 28, 30 grip between them one marginal edge portion of the trim strip material 20, and the other pair of pulley rollers 28, 30 grip between them the opposite marginal edge portion of the trim strip material 20. The pulley rollers 28, 30 are so driven as to advance the trim strip material 20 in a rearward direction through the machine, or to the left as viewed in FIGS. 3 and 4.

The pulley roller structure 24 also includes the knurled upper roller 32 and the lower roller 34 which is shown as being smooth surfaced but which may also be knurled if desired. The pulley rollers 32, 34 grip between them the mid-portion of the trim strip material 20 and are driven in synchronism with pulley rollers 28, 30 and likewise assist in advancing the trim strip material 20 in a rearward direction through the machine.

The components of the trim strip material 20, namely the strip of flexible material 12, the strands 15 and tapes 16 are drawn from suitable supply sources provided at the front of the machine. Thus the flexible strip 12 is drawn in a continuous length from a roll 36 supported on a spindle 38 at the front of the machine, strands 15 are drawn in continuous lengths from a suitable source (not shown) at the front of the machine, and the tapes 16 are drawn in continuous lengths from rolls 39 mounted on free turning spindles 40 supported on the table 42 of the machine. Since the pulley roller structure 24 continuously advances the trim strip material 20 after the flexible strip, strand and tape components have been secured together, obviously they continuously advance the separate components from their individual sources along predetermined paths in a rearward direction through the machine.

The strands 15 as they advance from their supply sources preferably pass in sequence through the sets of vertical and horizontal straightening devices 44 and 46. These are two strand-straightening devices 44, one for each strand, mounted on the table 42 at opposite sides thereof. The straightening devices 44 each include a plurality of rollers 48 mounted on horizontal axes and through which the strands 15 thread so as to be vertically straightened. The strands 15 preferably pass through guiding eyes 49 before they pass between rollers 48. There are two straightening devices 46, one for each strand, mounted on the table 42 at opposite sides thereof. Each straightening device 46 includes rollers 50 mounted on vertical axes and through which the strands thread in order to be horizontally straightened. The strands 15 as they progress rearwardly beyond the straightening devices 44 and 46 will therefore be substantially straight. It will be understood, however, that in a broader sense these strands 15 may if desired be of sinuous or other nonstraight configuration.

The strands 15 pass next preferably through the glue pots 52 mounted on table 42 at opposite sides thereof. The strands extend through openings in the front and rear walls of the glue pots and are coated with a suitable adhesive contained in the glue pots. The adhesive causes the tape to stick to the strands 15. Obviously the adhesive is not necessary if the strands are coated with plastic as shown in FIGS. 18–21 rather than covered with tape.

The strands 15, which as shown may be substantially horizontal and parallel to one another as they enter and leave the glue pots, next preferably pass through adhesive wipers 54 mounted on opposite sides of the table 42. The wipers may consist simply of annular members providing eyes through which the adhesive-coated strands pass to wipe away excess adhesive. The excess may be caught in receivers 56 located below the wipers 54.

The tapes 16 supported on rolls 39 are withdrawn from the rolls and pass over the guide rollers 60. The tapes 16 are guided alongside the respective adhesive-coated strands 15 into substantially parallel relation therewith by the tape-folding structure generally designated 62. The tape-folding structure 62 may comprise a pair of upright plates 64 secured to opposite sides of the table 42 and having the open-ended, generally horizontal folding elements 66 secured to the inner surfaces thereof and elongated in the direction of advance of the material through the machine. The folding elements 66 are generally U-shaped in cross-section and the angle defined thereby becomes gradually smaller in the direction of advance of the material through the machine. FIG. 5 illustrates the cross-section of the elements 66 at the entrant end thereof and it will be noted that the elements are fully open to 180° angles so as to be disposed flat and vertical, but are return bent at the upper and lower edges as indicated at 68. The vertically disposed tapes 16 lie flat against the fully open entrant ends of the folding elements 66.

FIG. 6 shows the cross-section of the folding elements 66 at an intermediate point where the U which they define is of an acute angle resulting in a progressive folding of the tapes 16 over the strands 15. The return-bent terminal portions 68 are seen as somewhat extended and have caused the upper and lower margins of the tape to be double folded inwardly upon themselves.

FIG. 7 illustrates the cross-section of the folding elements 66 at the exit end where the opposite legs of the U formed by the folding elements are substantially parallel with one another to tightly close the double-folded margins of the tapes 16 about the strands 15. The tapes 16 are pressed by this progressive folding action upon the adhesive-coated surfaces of the strands 15 to securely adhere the tapes to the strands. The return-bent terminal portions 68 are eliminated adjacent the exit ends of the folding elements.

The tape-covered strand reinforcements 14 consisting of the strands 15 and tapes 16 are caused to converge slightly as they pass through the folding elements 66 but remain substantially parallel to one another as they approach the sizer roller structure 70 which compresses the tape-covered strand reinforcements. The sizer roller structure 70 comprises the two pairs of upper and lower sizer rolls 72 and 74. The two lower rolls 74 preferably have rims or flanges 76 which engage opposite sides of the upper rolls 72 to confine the tape-covered strand reinforcements 14 passing therebetween. The lower rolls 74 are keyed on a shaft 78 journaled in supports 80. In order to drive shaft 78, a suitable drive and transmission may include the motor 82 for driving a belt 84, the belt extending over a pulley 86 keyed on a shaft 88 journaled in support 90. The shaft 88 has a gear 92 in mesh with a gear 94 on shaft 78. The upper rolls 72 may be driven by friction from the lower rolls 74 and are keyed on shaft 96 rotatably supported in bearing blocks 98. The bearing blocks 98 are shown as being vertically slidable on posts 100 projecting upward from supports 80, and coil springs 102 on the upper ends of the posts press the bearing blocks downward and produce a pressure friction engagement of the rolls 72 with the tape-covered strand reinforcements 14 to tightly compress the latter.

Beyond the sizer roll structure 70 there are the guides 110 which guide the tape-covered strand reinforcements 14 in laterally spaced, substantially parallel relation to the device 112 for folding the flexible material 12. The guide structure 110 comprises the plates 114 bolted to the support structure 116 which in turn is mounted on the table 26. The plates 114 are elevated from the support structure 116 slightly and extend toward one another. They have strips 118 on their upper surfaces shaped so as to cooperate with plates 114 in defining generally U-shaped recesses 120 which open toward one another and which receive and guide the tape-covered strand reinforcements 14.

As seen in FIG. 4, the flexible material 12 is drawn from roll 36 and passes over guides 122 on the frame and enters the space between the plates 114 and the support 116 of the guide structure 110. See also FIG. 10. Hence at this point, that is at the guide structure 110, the flexible material 12 is advanced into substantially parallel relation with and beneath the tape-covered strand reinforcements 14.

The tape-covered strand reinforcements 14 and subjacent flexible material 12 advance through the folding device 112 where the opposite longitudinal edges of the material 12 are folded over the two tape-covered strand reinforcements. As seen in FIG. 11 which illustrates the cross-section of the folding device 112 at or near the entrant end, the device has a flat horizontal web or base portion 124 which is slightly narrower than the strip of flexible material 12. The opposite longitudinal edges of the web or base portion 124 are return-bent inwardly to provide the horizontal flanges 126 above the web causing the opposite longitudinal edges of the flexible material to at least begin to curl or fold upwardly. It will be noted that the folding device 112 has a horizontal plate 128 spaced above the web 124 under which the material passes, the plate 128 having return-bent longitudinal edge portions 130 extending over and loosely confining the tape-covered strand reinforcements 14. This plate 128 is connected to the flanges 126 of the folding device 112 by the U-shaped member 132.

FIG. 12 shows the cross-section of the folding device 112 near the midpoint in its length. It will be seen that the device becomes progressively narrower in the direction of advance of the material, that is the web 124 becomes narrower, causing the opposite longitudinal edges of the flexible material to be folded progressively over the tape-covered strand reinforcements 14. It will also be noted that the separating plate 128 at this point no longer has the return-bent longitudinal edges.

At or near the exit end of the folding device 112, the web 124 is still narrower, causing the opposite longitudinal edges of the flexible material to be substantially fully folded over the tape-covered reinforcements 14, as shown in FIG. 13. Plates 128 has terminated at this point.

Means are provided to secure the reinforcements 14 to the strip of flexible material 12. Such means may comprise sewing machines 140 mounted on the table 26 of the frame beyond the folding device 112. These sewing machines are driven from a suitable power source such as the motor 82 through the transmissions 142. The sewing machines stitch or sew the opposite folded longitudinal edges of the flexible mateiral 12 over the tape-covered strand reinforcements 14, the thread 18 in FIG. 2 being shown as preferably stitched through the tapes 16. There is a hold-down plate 143 overlying the strip of flexible material between the sewing machines to retain the unstitched margin of the flexible material in folded condition until it reaches the second sewing machine. At this point the manufacture of the continuous reinforced trim strip material 20 is completed, and it is from the continuous length of trim strip material 20 that the individual trim strips 10 are severed.

The pulley mechanism 24 has already been referred to. However, as particularly shown in FIG. 14, the lower pulley rolls 30 are keyed on a shaft 150 journaled for rotation in supports 152. The presser rolls are driven from a suitable source of power, such as the motor 82, and, as seen in FIG. 14, a driving belt 154 extends from the power source over pulley 156 keyed on shaft 158 which is journaled in support 160. A gear on shaft 158 meshes with gear 162 on shaft 150 to drive the lower pulley rollers 30. The upper pulley rollers 28 are keyed on shaft 164 journaled in bearing blocks 166. The shaft 164 has a gear 168 meshing with gear 170 on shaft 150 to transmit the drive to the upper pulley rollers 28. The bearing blocks 166 are vertically slidable on posts 172 and are pressed downward by coil springs 174 to provide a friction pressure engagement of the pulley rollers 28, 30 with the opposite longitudinal edges of the trim strip material 20.

The pulley roller 32 is mounted on a shaft 180 journaled in supports 182, and a chain 184 extends about sprockets 186 and 188 on shafts 164 and 180 to transmit the drive from the pulley rollers 28 to the pulley roller 32. The pulley roller 32 cooperates with the pulley roller 34 in advancing the midportion of the trim strip material 20. The lower pulley roller 34 may be driven simply by friction engagement with the undersurface of the strip of flexible material 12.

There is a cutoff mechanism 190 beyond the pulley roller structure 24 for cutting off predetermined lengths of the trim strip material 20 (see FIG. 15). The cutoff mechanism may be of any suitable construction and in the present instance comprises a rotary cutter 192 mounted on a shaft 194 and having the diametrically opposite cutting blades 196 and 198. The shaft 194 is mounted to one side of the path of the trim strip material 20 and when rotated through one-half revolution one of its blades moves across the path of the trim strip material and severs a predetermined length therefrom. The shaft 194 has a sprocket 200 about which a drive chain 202 extends. The drive chain also extends around a sprocket 204 extending from clutch 206. The other side of the clutch is connected to a pulley 208 driven by a belt 210 from a motor 212. When the clutch 206 is engaged the drive from the motor 212 is completed to the cutter 192 to rotate the latter and cut off a length of the trim strip material 20.

Beyond the cutoff device 190 there is an elongated channel-shaped receiver or trough 216 having side walls 218 spaced far enough apart to accommodate the trim strip material 20. The bottom wall 220 of the trough is supported on an arm 222 secured to a shaft 224. The shaft 224 is rotatable to cause the bottom 220 to swing down in the direction of the arrow in FIG. 15 to discharge a length of trim strip severed by the cutter.

The shaft 224 is rotated by a piston cylinder assembly 226 having a cylinder 228 mounted on the frame of the machine. A spring within the cylinder normally retracts the piston. The piston rod 230 is pivoted to a crank 232 secured to shaft 224. When the piston is retracted the bottom 220 of the trough 216 is held up in the position shown in FIG. 15. However, when the piston is extended the shaft 224 is rotated so as to swing the bottom of the trough downward and discharge the severed trim strip 10.

Any suitable means may be provided to operate the cutting mechanism. Preferably, there is a limit switch LS mounted on the trough 216 having an actuating arm 236 extending into the trough 216 and adapted to be engaged by the end of the advancing trim strip material 20. When the switch arm 236 is engaged it closes the limit switch energizing relay 240 (see FIG. 17). Energization of relay 240 is effective to close relay contact 241 and engage clutch 206 to rotate the cutter 192 and effect severing of a trim strip 10 from the advancing continuous length of trim strip material 20. Energization of relay 240 also closes relay contact 243 to operate valve V and admit pressure fluid to the piston end of cylinder 226 through lines 245 and 247, extending the piston rod 230 and opening the bottom of the trough 216 to discharge the severed trim strip 10. The discharge of the severed trim strip releases the actuating arm 236 to open limit switch LS and thereby deenergize relay 240. Deenergization of relay 240 causes contacts 241 and 243 to open, releasing clutch 206 to discontinue the drive to the cutter 192, and also permitting valve V to open line 245 to the exhaust line 249 causing the piston in cylinder 228 to retract to its normal position and return the bottom wall 220 of the trough 216 to the FIG. 15 position. Continued advance of the trim strip material 20 into the trough causes repeated operation of the cutter 192 and the mechanism for discharging the severed trim strip. The limit switch LS may be adjustably mounted at any point along the length of the trough 216 to vary the length of the trim strips severed. Preferably, one or more hold-down blocks 250 may be employed to hold down the advancing trim strip material so that it will engage the arm 236 of the limit switch. One such block 250 is shown pivoted on a horizontal axis by a wire 251 mounted on trough 216.

The machine will operate continuously to produce the continuous length of trim strip material 20 from the strip of flexible material 12, strands 15 and tape 16, and to produce the trim strips 10 from the length of trim strip material, all as part of a single continuous, unitized operation.

FIGS. 18 to 21 illustrate a modification of the inveniton in which the strands 15 are coated with a sheath or cover 299 of plastic or the like rather than being covered with the tapes 16. Accordingly, the structure in FIGS. 18–20 omits the tapes 16 as well as the glue pots 52, wipers 54 and tape-folding structure 62.

Figure 19:
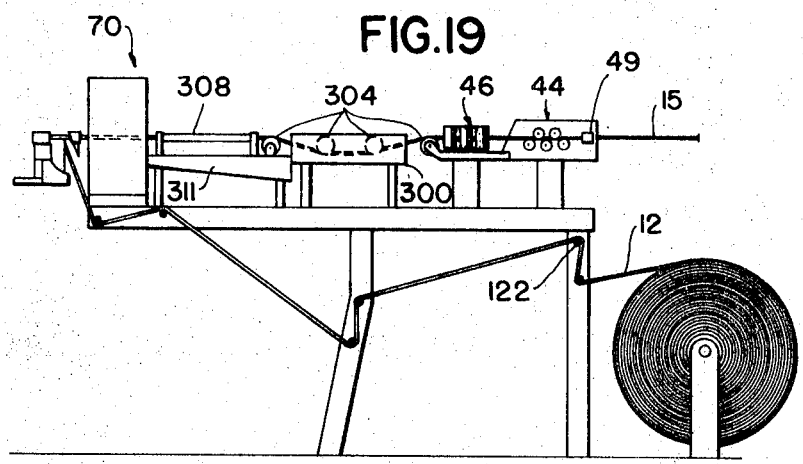
FIG. 19 is a side elevational view of the apparatus shown in FIG. 18.
Figure 20:
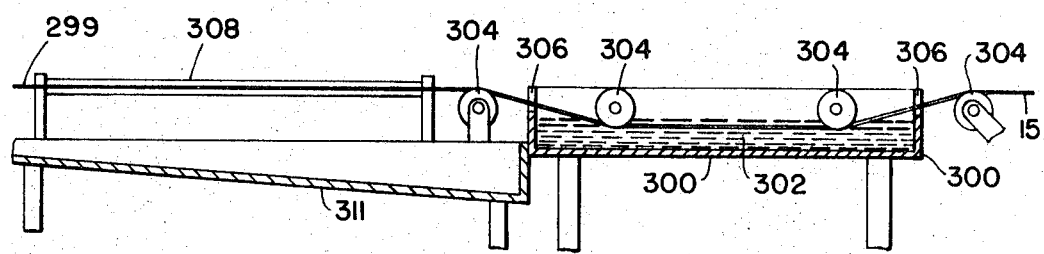
FIG. 20 is an enlarged view with parts in section of a portion of FIG. 19.

As viewed in FIGS. 18–20, the strands 15 after they pass between the straightening devices 44 and 46 are guided through a bath or container 300 containing a supply of a suitable coating material in liquid form, designated 302. The coating material may for example be a plastisol or any suitable thermosetting resinous material or any other suitable material which will adhere to and form a reinforcing cover 299 for the strands.

The container 300 is elongated in the direction of strand travel as shown, and roller guides 304 within and at both ends of the container guide the strands through the container and cause them to be submerged in the liquid coating material 302. The slight change in direction of the strands 15 as they are guided into and out of the container 300 does not distort the shape or configuration of the strands which as heretofore mentioned may be straight or of any desired configuration. The front and rear walls of the container 300 are notched as indicated at 306 to clear the strands 15 where they enter and leave the container.

Preferably heat lamps 308 are provided which are disposed on the outer sides of the two coated strands at a point beyond the container 300. The heat lamps 308 extend in the same general direction as the advancing strands and serve to heat and dry the cover 299 of coating material on the strands before the strands pass through the sizer roller structure 70. A drip pan 311 may, if desired, be disposed beneath the covered strands as they leave the container 300 to catch any excess coating material. The strip 12 of flexible material may then be folded over and secured to the covered strands in the same manner described in connection with FIGS. 1–17.

Figure 21:
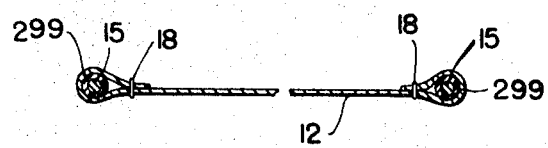
FIG. 21 is an enlarged sectional view similar to FIG. 2 but showing the trim strip material made by the modified apparatus.

FIG. 21 illustrates in cross-section the trim strip material in which the opposite longitudinal edges of the strip of flexible material is folded over the plastic covered strands and stitched or otherwise secured in position. Obviously in this form of the invention the stitching would normally not pass through the cover 299 of plastic or other material on the strands.

Otherwise the method and apparatus as described and shown in connection with FIGS. 18–20 may be the same as in the first embodiment.

I claim:

1. Apparatus for making a trim strip composed of an elongated strip of flexible material reinforced with elongated strands covered by elongated tapes, comprising means for advancing said strip of flexible material, strands and tapes along predetermined paths, means for coating adhesive on the advancing strands, means for guiding the advancing tapes alongside the respective advancing, adhesive-coated strands, means for folding the advancing tapes over the respective advancing, adhesive-coated strands to adhere the tapes to the strands and provide tape-covered strands, means for guiding the advancing tape-covered strands in laterally spaced relation in a predetermined direction, means for guiding the advancing strip of flexible material adjacent to and in the same general direction as the guided advancing tape-covered strands, means for folding the opposite longitudinal edges of the guided advancing strip of flexible material over the guided advancing tape-covered strands, and means for securing the opposite folded longitudinal edges of the advancing strip of flexible material in folded condition over the advancing tape-covered strands to provide trim strip material from which trim strips of predetermined lengths may be severed, said tape-folding means including generally U-shaped open-ended elements which are elongated in the direction of advance of said tapes and strands, said U-shaped elements being of relatively open form defining obtuse angles adjacent their entrant ends but progressively closing in the direction of advance to define acute angles adjacent their exit ends so as to gradually fold said tapes over said strands during the advance thereof.

2. The apparatus defined in claim 1, wherein said elements define angles of approximately 180° at their entrant ends so as to lie substantially flat against said tapes in surface-to-surface relation therewith.

3. The apparatus defined in claim 1, wherein the legs of the U of said elements are terminally, inwardly returnbent to double fold the tapes.

4. Apparatus for making a trim strip composed of an elongated strip of flexible material reinforced with elongated covered strands, comprising means for advancing said strip of flexible material and strands, means for applying a covering to said advancing strands to provide covered strands, means for guiding the advancing covered strands in laterally spaced relation in a predetermined direction, means for guiding the advancing strip of flexible material adjacent to and in the same general direction as the guided advancing covered strands, means for folding the opposite longitudinal edges of the guided advancing strip of flexible material over the guided advancing covered strands, and means for securing the opposite folded longitudinal edges of the advancing strip of flexible material in folded condition over the advancing covered strands to provide trim strip material from which trim strips of predetermined lengths may be severed, said strip-folding means comprising a web adapted to underlie the strip of flexible material which is elongated in the direction of advance of said strip of flexible material, said web tapering in width in the direction of advance of said strip of flexible material and having open, returnbent opposite longitudinal edges adapted to progressively fold the opposite longitudinal edges of the advancing strip of flexible material over the covered strands.

5. Apparatus for making a trim strip composed of an elongated strip of flexible material reinforced with at least one elongated strand covered by an elongated tape, comprising means for advancing said strip of flexible material, strand and tape, means for guiding the advancing tape adjacent to the advancing strand, means for folding the advancing tape over the adjacent advancing strand to provide a tape-covered strand, means for guiding the advancing tape-covered strand in a predetermined direction, means for guiding the advancing strip of flexible material adjacent to and in the same general direction as the advancing tape-covered strand, means for folding a portion of the guided advancing strip of flexible material over the guided advancing tape-covered strand, means for securing the folded portion of the advancing strip of flexible material over the advancing tape-covered strand to provide advancing trim strip material, and means for severing predetermined lengths of trim strips from the advancing trim strip material.

6. Apparatus for making a trim strip composed of an elongated strip of flexible material reinforced with elongated strands covered by elongated tapes, comprising means for advancing said strip of flexible material, strands and tapes along predetermined paths, means for coating adhesive on the advancing strands, means for guiding the advancing tapes alongside the respective advancing, adhesive-coated strands, means for folding the advancing tapes over the respective advancing, adhesive-coated strands to adhere the tapes to the strands and provide tape-covered strands, means for guiding the advancing tape-covered strands in laterally spaced relation in a predetermined direction, means for guiding the advancing strip of flexible material adjacent to and in the same general direction as the guided advancing tape-covered strands, means for folding the opposite longitudinal edges of the guided advancing strip of flexible material over the guided advancing tape-covered strands, means for securing the opposite folded longitudinal edges of the advancing strip of flexible material in folded condition over the advancing tape-covered strands to provide advancing trim strip material, and means for severing predetermined lengths of trim strips from the advancing trim strip material.

7. The apparatus defined in claim 5, wherein said tape-folding means includes a generally U-shaped open-ended element which is elongated in the direction of advance of said tape and strand, said U-shaped element being of relatively open form adjacent its entrant end but progressively closing in the direction of advance to define an acute angle adjacent its exit end so as to gradually fold said tape over said strand during the advance thereof.

8. The method of making a trim strip composed of an elongated strip of flexible material reinforced with at least one elongated strand covered by an elongated tape, comprising advancing said strip of flexible material, strand and tape, guiding the advancing tape adjacent to the advancing strand, folding the advancing tape over the adjacent advancing strand to provide a tape-covered strand, guiding the advancing tape-covered strand in a predetermined direction, guiding the advancing strip of flexible material adjacent to and in the same general direction as the advancing tape-covered strand, folding a portion of the guided advancing strip of flexible material over the guided advancing tape-covered strand, securing the folded portion of the advancing strip of flexible material over the advancing tape-covered strand to provide advancing trim strip material, and severing predetermined lengths of trim strips from the advancing trim strip material.

9. The method of making a trim strip composed of an elongated strip of flexible material reinforced with elongated strands covered by elongated tapes, comprising advancing said strip of flexible material, strands and tapes along predetermined paths, coating adhesive on the advancing strands, guiding the advancing tapes alongside the respective advancing adhesive-coated strands, folding the advancing tapes over the respective advancing, adhesive-coated strands to adhere the tapes to the strands and provide tape-covered strands, guiding the advancing tape-covered strands in laterally spaced relation in a predetermined direction, guiding the advancing strip of flexible material adjacent to and in the same general direction as the guided advancing tape-covered strands, folding the opposite longitudinal edges of the guided advancing strip of flexible material over the guided advancing tape-covered strands, securing the folded opposite longitudinal edges of the advancing strip of flexible material in folded condition over the advancing tape-covered strands to provide advancing trim strip material from which trim strips of predetermined lengths may be severed, and severing predetermined lengths of trim strips from the advancing trim strip material.

10. The method defined in claim 9, wherein the opposite longitudinal edges of the strip of flexible material are secured in folded condition by stitching which also secures the tapes to the folded longitudinal edges of the strip of flexible material.

References Cited
UNITED STATES PATENTS

| | | | |
|---|---|---|---|
| 2,016,900 | 10/1935 | Humberstone | 156—436X |
| 2,371,357 | 3/1945 | Schindler | 156—176 |
| 2,756,706 | 7/1956 | Arnold | 161—52X |

BENJAMIN R. PADGETT, Primary Examiner

S. HELLMAN, Assistant Examiner

U.S. Cl. X.R.

156—141, 166, 436